Aug. 14, 1945.  C. R. DALE  2,382,609
RECORDING INSTRUMENT FOR OIL WELLS
Filed Dec. 16, 1940  4 Sheets-Sheet 1
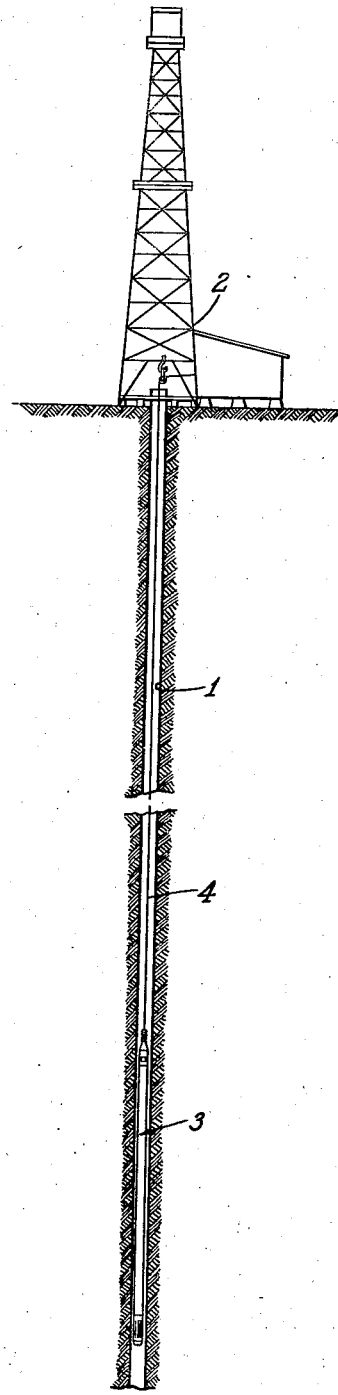
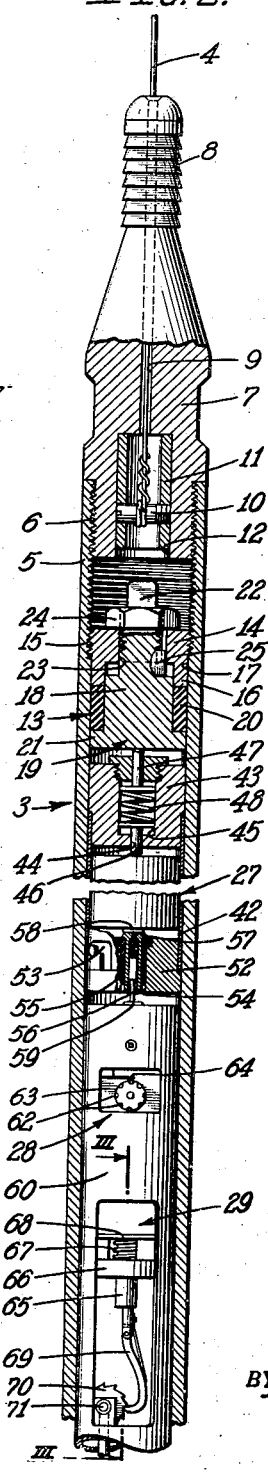
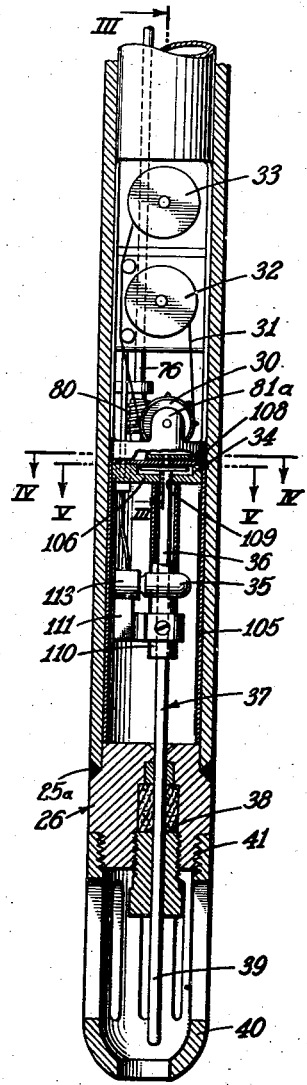
CLARENCE R. DALE
INVENTOR:
BY
ATTORNEY

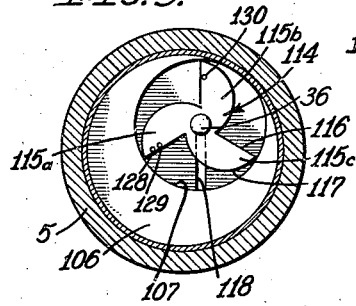
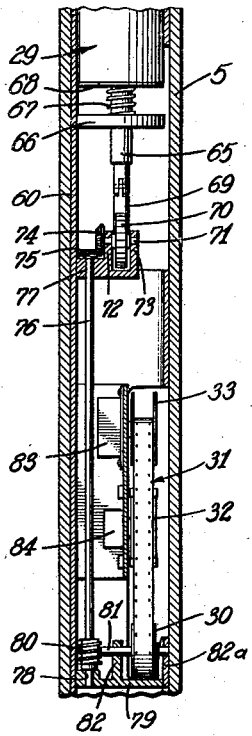
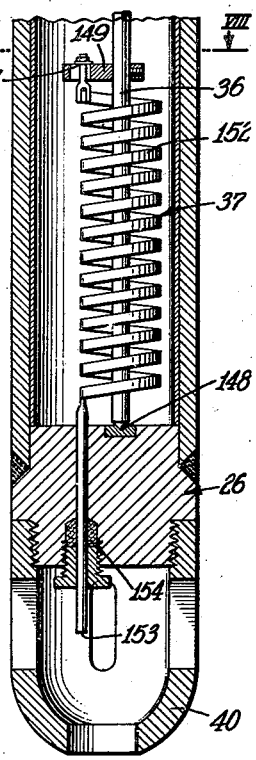
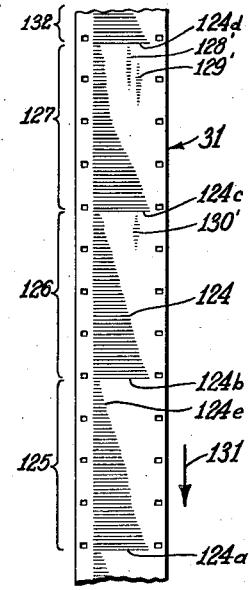
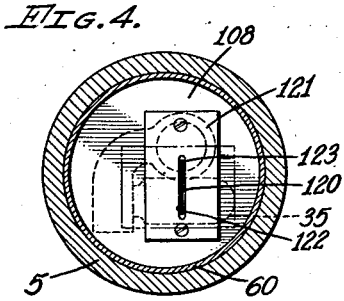

Aug. 14, 1945.    C. R. DALE    2,382,609
RECORDING INSTRUMENT FOR OIL WELLS
Filed Dec. 16, 1940    4 Sheets—Sheet 3
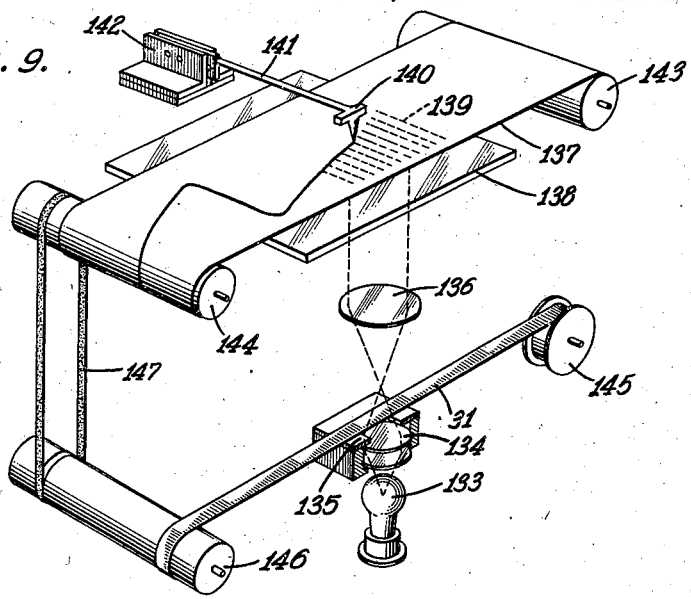
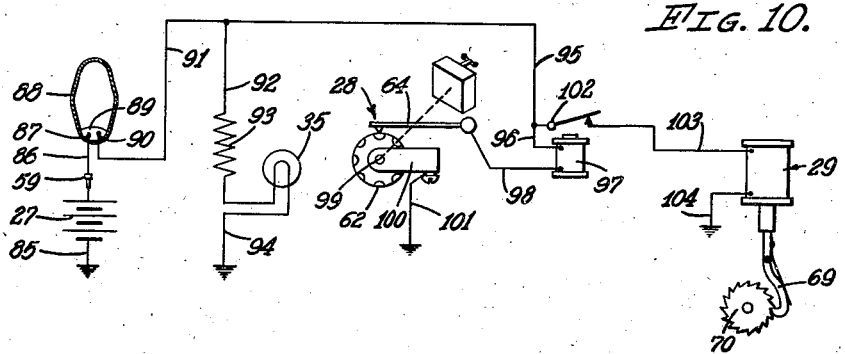
CLARENCE R. DALE
INVENTOR:
BY
ATTORNEY Aug. 14, 1945. C. R. DALE 2,382,609
RECORDING INSTRUMENT FOR OIL WELLS
Filed Dec. 16, 1940 4 Sheets-Sheet 4

CLARENCE R. DALE
INVENTOR:

BY Harold W. Mattingly
ATTORNEY

Patented Aug. 14, 1945

2,382,609

UNITED STATES PATENT OFFICE 2,382,609

RECORDING INSTRUMENT FOR OIL WELLS

Clarence R. Dale, Los Angeles, Calif., assignor, by direct and mesne assignments, of thirteen and seventy-five one-hundredths per cent to J. R. Pemberton and forty-five per cent to Technical Oil Tool Corporation, Ltd., Los Angeles, Calif., a corporation of California Application December 16, 1940, Serial No. 370,320

3 Claims. (Cl. 234—60)

My invention relates to a device for recording conditions in a well bore and which is particularly adapted to determining the location and character of the geological structure giving rise to variations in certain of the recorded conditions.

This application is a continuation-in-part of my copending application Serial No. 324,522, filed March 18, 1940, and entitled "Recording instrument for oil wells."

In the drilling of deep well bores, such as oil wells, and in the production of oil and gas from such bores, it is essential that knowledge be had of certain physical conditions which exist within the well bore such as temperature, pressure, formation conductivity, angle of inclination of the well bore, direction of inclination, and like conditions. For exemple, it is necessary that a complete survey or determination of the angle of inclination of the well bore to the vertical and the direction of such inclination over the entire length of the bore be had in order to determine the actual horizontal location of the bottom of the well. Similarly, knowledge of the depth at which certain geological structures or strata are encountered is extremely useful in determining the manner of drilling adjacent wells, and a series of such surveys is of material assistance in defining the probable limits or bounds of a particular oil pool.

There are now available numerous types of instruments for measuring these physical conditions which exist in well bores, but there is not at present available any entirely satisfactory device or instrument for recording the measurements made by these measuring devices. The present recording devices may be classified as being of either of two types; namely, (1) those which are entirely self-contained, and (2) those which are connected by means of a signalling circuit to suitable recording equipment located at the ground surface.

In the case of the first or self-contained type, the recording instruments are deficient in that the records which are provided are extremely small, the measurements being recorded thereon in an extremely reduced scale so that it becomes very difficult to ascertain from an inspection of the record the magnitude of the condition which has been measured with anything approaching high accuracy. Furthermore, the self-contained recording instruments have an extremely limited range of magnitudes which they are capable of recording, thus limiting the usefulness of such devices to those wells wherein the amount of variations in the condition to be recorded does not exceed the capabilities of the instrument.

Furthermore, each of the various types of self-contained recording instruments presently available are adapted for use in recording the measurements made by only a single type of measuring instrument, thus requiring the use of an entirely different recording instrument structure for each of the various types of measuring instruments which are to be used for measuring different well bore conditions. The self-contained types of recorders are, because of their small size, delicate and expensive and subject to costly damage. Such delicate instruments require the employment of skilled technicians for their operation and maintenance.

The second type of recording unit embodies the disadvantages inherent in providing a signalling circuit extending from the instrument to the ground surface. Among these disadvantages may be included the extremely high cost of the lowering or supporting cable which must, of a necessity, include the electrical conductors for forming the signaling circuit and also the loss of time and money attendant upon the repairing of brakes in in the electrical conductor portions of such supporting cables. Furthermore, the recording instruments of this type are subject to considerable error as a result of the long transmission circuit which is extended to the ground surface unless elaborate and expensive means is employed for reducing this error to a negligible value.

It is, therefore, an object of my invention to provide a recording instrument for use with a device capable of measuring a selected physical condition existing in a well bore, which instrument overcomes the above noted disadvantages by being entirely self-contained and operable independently of any connection with ground surface equipment, and by providing a record which is drawn to a much larger scale than that which is produced by the present recording devices.

It is also an object of my invention to provide a recording instrument of the character set forth in the preceding paragraph which includes a long record strip to which is imparted a time controlled movement past a recording element capable of recording the magnitude of a condition measured by the measuring device.

It is an additional object of my invention to provide a recording instrument of the character set forth in the preceding paragraphs in which variations of magnitude of the recorded condition are in the direction of the width of the record strip.

It is a further object of my invention to provide a recording instrument of the character set forth in the preceding paragraph in which the total width of the record strip represents one of a plurality of ranges of magnitudes measured by the measuring device.

It is additionally an object of my invention to provide a measuring instrument of the character set forth hereinbefore which includes a means for suitably marking the record strip to identify each of the ranges of condition magnitudes recorded thereon.

It is also an object of my invention to provide a measuring instrument of the character set forth hereinbefore in which the record strip comprises a long length of photographic film and which also includes a means for projecting on said film a line of light, the length of which is proportional to the magnitude of the condition measured by the measuring device, the film being moved past the line of light in steps of predetermined lengths of film at predetermined time intervals.

Other objects and advantages of my invention will be apparent from a study of the following specification, read in connection with the accompanying drawings, wherein:

Fig. 1 is a longitudinal sectional view of an oil well bore illustrating the manner in which the recording instrument of my invention is lowered into the bore;

Figs. 2 and 2A taken together comprise a longitudinal sectional view of a recording instrument constructed in accordance with the preferred embodiment of my invention and adapted to be actuated by a temperature measuring device;

Fig. 3 is a fragmentary sectional view taken substantially along the line III—III of Figs. 2 and 2A to show additional details of the construction of the instrument;

Fig. 4 is a cross sectional view taken substantially along the line IV—IV of Fig. 2A illustrating the details of construction of a line aperture;

Fig. 5 is a transverse section taken substantially along the line V—V of Fig. 2A and showing a form of light valve or recording element included in the instrument;

Fig. 6 is a fragmentary plan view illustrating the appearance of a record produced by the instrument illustrated in the preceding figures;

Fig. 7 is a fragmentary sectional view illustrating a modified form of construction of that portion of the device illustrated in the lower end of Fig. 2A, this modification comprising a means for measuring the pressure existing in a well bore;

Fig. 8 is a cross sectional view taken substantially along the line VIII—VIII of Fig. 7;

Fig. 9 is a diagrammatic perspective view illustrating the construction of an amplifying or magnifying device which may be used for the purpose of enlarging the record which is illustrated in Fig. 6;

Fig. 10 is a wiring diagram illustrating the electrical circuits employed in the instrument;

Figure 12:
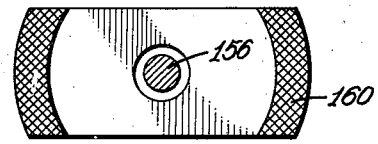
Fig. 12 is a cross sectional view taken substantially along the line XII—XII of Fig. 11.

Referring to the drawings, I have illustrated in Fig. 1 a typical oil well bore 1 as being surmounted by a derrick 2 which supports hoisting equipment adapted to raise or lower an instrument 3 in the bore 1 as by means of a light cable or piano wire 4. The instrument 3 is preferably constructed along the lines illustrated in Figs. 2 and 2a and includes an elongated tubular housing 5, to the upper end of which is attached, as by means of screw threads 6, an adapter or connector 7.

The connector 7 is provided with a head 8 permitting the retrieving of the instrument by means of a suitable fishing tool, such as an overshot in case the instrument should be lost in the well bore. The connector 7 may be of any conventional construction, but since I prefer to use a piano wire for the supporting means 4, the connector 7 is preferably bored as indicated at 9 to receive the lower end of the wire 4, which lower end may be wound about and suitably tied to a transversely extending pin 10 threadedly engaged with a sleeve 11 loosely received in an upwardly extending cylindrical recess 12 formed in the body of the connector 7.

Immediately below the connector 7 I provide a packing construction 13 for the purpose of sealing off the interior of the housing 5 and preventing leakage of oil well fluid into the interior thereof. The packing construction 13 may, if desired, be conventional, but I have found that the form illustrated in Fig. 2 is particularly suitable for use in an instrument of the character illustrated herein. The packing 13 preferably comprises a stationary ring member 14 secured within the housing 5 as by means of threads 15 and defining a downwardly extending flange 16 adapted to be received within a recess 17 defined by the walls of the housing 5 and a reduced diameter portion 18 of a movable clamping member 19. Within the recess 17 I dispose packing material 20 which may rest upon an annular flange portion 21 formed on the lower end of the member 19.

The members 14 and 19 may be drawn into clamping relation with each other as by passing a stud portion 22 upwardly through an aperture 23 formed in the stationary member 14 and by providing a nut 24 adapted to draw the member 19 toward the stationary member 14. The member 19 is preferably fitted with a key 25 arranged in such manner as to permit sliding movement of the member 19 relative to the stationary member 14, while preventing relative rotation between these members.

The lower end of the housing 5 is preferably welded as indicated at 25a or otherwise suitably connected to a lower end member 26 so as to seal off the lower end of the housing 5. There is disposed within the housing 5 and between the packing unit 13 and the lower end member 26 a set of batteries 27, a time controlled commutating device 28, and a solenoid 29 which is connected in circuit with the batteries 27 and the commutating device 28 and adapted to drive a sprocket 30 to intermittently advance a record strip 31, the strip 31 being unwound from a supply reel 32 and wound upon a take-up reel 33. Below the sprocket 30 there is mounted a recording unit 34 adapted to define and project upon the record strip 31 a line of light whose length is representative of the magnitude of a condition existing in the well bore; the light for producing such a line of light being developed by an incandescent lamp 35.

The recording unit 34 is adapted to be driven by a shaft 36 to which is connected a condition responsive element 37. The condition responsive device 37 is extended through the lower head member 26 and sealed thereto as by a means of a packing gland 38, the lower end 39 of the condition responsive means being extended exteriorly of the housing 5 and surrounded by means of a guard member 40 secured to the head member 26 as by means of screw threads 41.

The source of electric power 27 may comprise one or more dry cell batteries which are received within an inner housing portion 42 which may be inserted into the interior of the housing 5 after the connector 7 and the packing unit 13 are removed therefrom. The inner housing 42 is preferably closed at its upper end by means of a plug 43 which serves also as an electrical connector for connecting one terminal of the batteries 27 to the housing 5. The plug member 43 is accordingly preferably bored as indicated at 44 and recessed as indicated at 45 to receive and guide a pair of oppositely disposed contact members 46 and 47 which are adapted to be urged away from each other as by means of a compression spring 48 interposed therebetween, the contact pin 46 being adapted to engage one terminal of the battery 27 and the other contact 47 being engageable with the lower surface of the member 19, whereby an electrical connection between one terminal of the battery and the housing 5 is afforded.

The lower end of the housing 42 is preferably closed as by means of a removable plug 52, the plug 52 being removably secured to the lower end of the housing 42 as by means of a pin and bayonet slot construction 53. The plug member 52 is preferably bored as indicated at 54 to receive an insulating sleeve 55 within which is mounted spring pressed contact pins 56 and 57 adapted to provide an electrical connection between the other terminal 58 of the batteries 27 and a terminal 59 associated with the time controlled commutating device 28.

The time controlled commutating device 28 is preferably housed within a second inner housing portion 60 and includes a suitable spring driven clockwork (not shown) arranged to drive a commutator drum 61 which includes a plurality of electrically conductive commutator segments 62 separated from each other as by insulated spacers 63. A brush member 64 is disposed in a position to alternately engage the segments 62 and the insulated spacers 63 as the commutator 61 is slowly rotated by the clockwork which is drivably connected thereto.

The inner housing 60 also supports the solenoid 29 which preferably comprises an electrical coil having a magnetic plunger or armature 65 supported for vertical sliding movement within the interior of the solenoid 29. The plunger 65 is preferably guided during such sliding movement as by a guiding member 66 and is normally urged into a lowermost position as by means of a compression spring 67 interposed between the guide member 66 and a lower end 68 of the coil comprising the solenoid 29.

The armature 65 supports a spring pressed pawl or hook 69 adapted to engage a ratchet wheel 70 so that upon energization of the solenoid 29, the engagement of the hook 69 with the ratchet wheel 70 will effect a partial rotation of the ratchet wheel upon the resulting upward movement of the armature 65 and so that the armature 65 may be returned to its lowermost position without imparting any rotation to the ratchet wheel 70.

The ratchet wheel 70 is preferably mounted upon a shaft 71 journaled for rotation in suitable bearing members 72 and 73 (see Fig. 3) secured to the inner housing 60. Upon one end of the shaft 71 there is mounted a bevel gear 74 drivably engaged with a bevel gear 75 secured to a vertically extending shaft 76. The shaft 76 is preferably journaled as indicated at 77 in the bearing post 72—73 and as indicated at 78 in a transversely extending web member or plug 79 inserted into the lower end of the inner housing 60. The lower end of the shaft 76 carries a worm gear 80 which is drivably engaged with a worm wheel (not shown) secured to a transversely extending shaft 81. It is upon the shaft 81 that the sprocket 30 is non-rotatably secured, the shaft 81 being suitably journaled for rotation in a bearing post 82 of the web member 79 and in a portion 82a of the housing 60.

Between the web member 79 and the bearing bracket 72—73 I support within the housing 60 a clockwork or other spring driven mechanism 83, to the driven shaft of which is secured the take-up reel 33, the clockwork 83 being so arranged as to tend to rotate the reel 33 in a direction to roll thereon the record strip 31 as it is fed from the sprocket 30, the speed of rotation of the take-up reel 33 being controlled by the speed at which the record strip 31 is advanced by the sprocket 30. Associated with the clockwork 83 and housed within a suitable interior housing 84 there is provided a friction device adapted to resist rotation of the shaft upon which the supply reel 32 is mounted so that that portion of the record strip which is extended between the supply reel 32 and the sprocket 30 is maintained taut at all times.

Referring now to Fig. 10, it will be noted that one terminal of the batteries 27 is indicated at 85 as being connected to ground, this connection 85 representing the partial circuit established by the connector pins 46 and 47. The other terminal of the battery 27 is connected as above described to the contact terminal 59 from which is extended a wire 86 into connection with one terminal 87 of a mercury switch 88. The mercury switch 88 preferably comprises an envelope of insulating material within which is disposed a globule of mercury 89. The contact members 87 and 90 are extended into the walls of the envelope 88 in such position as to be electrically interconnected by the globule 89 of mercury whenever the envelope 88 is disposed in a position such as that illustrated in Fig. 10.

This switch mechanism is preferably mounted in the upper portion of the interior housing 60 in such position that the envelope 88 occupies the position illustrated in Fig. 10 when the instrument housing 5 is disposed substantially vertically. Thus, when the housing 5 is disposed horizontally, the switch contacts 87 and 90 will be disconnected so as to disconnect the battery 27 from the remainder of the equipment to thereby conserve the life of the battery and limit its operation to such time as the housing 5 is disposed in an upright position such as when it is being lowered into a well bore.

The switch terminal 90 is preferably connected as by means of conductors 91 and 92 to a resistance 93 connected in series circuit 94 with the incandescent lamp 35. The resistance 93 is preferably of such form as to supply the proper voltage to the lamp 35, this lamp usually being designed for operation on a voltage considerably less than that developed by the batteries 27.

The conductor 91 is also connected as by means of conductors 95 and 96 to one terminal of the coil of a relay 97, the other coil terminal of such relay being connected as by means of a conductor 98 to the commutator brush 64.

The commutator segments 62 are each preferably internally connected to the shaft 99 upon which the commutator is rotatably supported and the bearing structure 100 which is used to rotatably support the shaft 99 is preferably grounded as indicated at 101. Thus, as the commutator 62 is rotated, the relay coil 97 is alternately energized and deenergized so as to alternately open and close its normally open contacts 102.

The contacts 102 have one terminal connected to the conductor 96 and the other terminal connected as by means of a conductor 103 to one terminal of the solenoid 29, the other terminal of said solenoid being connected as by means of a conductor 104 to ground. Thus, the solenoid 29 is energized and de-energized in synchronism with the energization and de-energization of the relay 97 and serves to rotate the ratchet wheel 70 one notch for each engagement of the brush 64 with a commutator segment 62.

The clockwork which drives the commutator 61 is preferably arranged to rotate the commutator at such speed that the ratchet wheel 70 is advanced at the rate of approximately one hundred and twenty notches per minute and the drive ratio between the ratchet wheel 70 and the sprocket 30 is preferably so arranged as to advance the record strip at the rate of approximately one inch per minute. These speeds are those which I have found to be suitable for most applications of the recording instrument of my invention, but it will be readily understood that other speeds may be used if found desirable. In any event, the intermittent motion which is imparted to the record strip 31 permits the operation of the recorder 34 to record thereon the magnitude of the condition measured by the condition measuring means 37 during those portions of the intermittent motion at which the record strip is held stationary.

The recording unit 34 is preferably mounted in the upper end of an inner housing 105 which supports a transversely extending end member or bulkhead 106, the bulkhead 106 being provided with a recess 107 which is closed by a cap member 108. The bulkhead 106 is provided with an aperture 109 communicating with the bottom of the recess 107 and through which the vertically extending shaft 36 is passed, the shaft 36 being also surrounded by a sleeve 110 carried by the bulkhead 106 and serving to support a lamp socket bracket 111 upon which is affixed a lamp socket 113 in which is mounted the incandescent lamp 35.

The upper end of the shaft 36 has secured thereto a recording member or light valve 114 (see Fig. 5) which is received and enclosed within the recess 107. The recording member 114 preferably comprises a shutter member having a plurality of equally spaced and identically shaped vanes 115, there being illustrated in Fig. 5 three of such vanes 115a, 115b and 115c, each of the vanes 115 being defined by a radially extending edge 116 and a curved edge 117 so arranged as to gradually obscure a light transmitting slot 118 formed in the bottom of the recess 107 upon rotation of the shaft 36.

The cover member 108 is preferably provided with a slot 119 which is disposed in alignment with the slot 118, and a slit defining member 120 is preferably clamped between the cover member 108 and a clamping member 121 secured thereto, the slit defining member 120 having an extremely narrow elongated slit 122 formed therein in a position to receive and transmit light falling thereon through the slots 118 and 119.

In order that light passed through the slit 122 may be projected on to the record strip 31, the clamping member 120 is preferably slotted as indicated at 123 in Fig. 4, and the entire arrangement of slit, slots and incandescent lamp 35 are disposed vertically below and in alignment with the axis of the sprocket 30. The sprocket 30 is so positioned as to cause the record strip 31 to pass closely adjacent the slit 122 so that there is cast on the surface of the record strip a very thin beam of light, the length of which is a direct indication of the magnitude of the condition measured by the condition measuring means 37.

I have found that excellent records can be produced with the device of my invention if the slit 122 has a width of approximately .002 inch and a length approximating the net width of the record strip between the sprocket holes.

In the preferred form of my invention I employ as the record strip 31 16 mm. motion picture film of standard manufacture which is coated with a relatively slow speed light sensitive emulsion. The emulsion speed and the brilliance of the lamp 35 are so adjusted as to provide a complete exposure of the film during the intervals between the intermittent advancing movements of the film. Thus there is produced by the operation of the recorder of my invention a record of the character illustrated in Fig. 6 comprising a plurality of transversely extending lines 124 of varying length, each of said lines being spaced longitudinally of the record strip 31 by a relatively small distance.

The magnitude of the condition measured by the condition measuring means 37 is indicated by the transverse length of the lines 124. This result is accomplished by forming the curved edge 117 of the light valve 114 as a portion of a simple or Archimedes spiral so arranged that when one of the straight edges 116 is disposed substantially parallel to the slit 122, the entire length of the slit will be exposed and so arranged that the exposed length of slit 122 will be gradually reduced as the light valve 114 is rotated in a clockwise direction until after 120° of rotation substantially the entire length of the slit 122 is obscured.

The range of magnitudes which can be measured by the condition measuring means 37 may be such as to produce one or more complete revolutions of the light valve 114 so that there is produced three or more groups 125, 126 and 127 of transversely extending marks 124, each of such groups representing a different scale or range of values. For example, in the form of the invention which is illustrated in Figs. 2 and 2A, the condition responsive means 37 preferably comprises a bi-metallic thermometer of the torsion type adapted to produce one complete revolution of the shaft 36 upon raising the temperature of the exposed end 39 of such thermometer from 50° to 350° F. so that one complete revolution of the light valve 114 represents 300° F. increase in temperature. It follows, therefore, that one-third of such revolution will represent a temperature range of 100° F. and that such a 100° range is covered by each of the groups 125, 126 and 127. It is, therefore, necessary to identify on the record strip which of the temperature ranges is embodied in each of the groups; i. e., whether the group represents the range of temperatures from 50 to 150°, 150 to 250°, or 250 to 350°.

For the purpose of identifying these ranges, I provide in one of the vanes 115, the vane 115a for example, a pair of radially aligned, small light transmitting apertures 128 and 129 and in the next clockwise adjacent vane 115b a single aperture 130, the third vane 115c being devoid of such apertures. Preferably the recorder is so arranged that the vane 115c is identified with the range of temperatures extending from 50 to 150° F., whereas, the vane 115b is identified with the next higher temperature range, and the vane 115a is identified with the range of temperatures extending from 250 to 350° F.

When the apertures above referred to are disposed in alignment with the slit 122, they will produce marks 128′, 129′ and 130′ on the record strip 31. Suppose, for example, that the record strip 31 is moved past the slit 122 in the direction indicated by the arrow 131. At the time the instrument is placed in operation, the starting temperature is observed. Let us suppose that this is found to be 50° F. Thus, the first mark 124a recorded on the record strip will extend substantially the full width of the strip so as to represent a temperature of 50° F. As the temperature is gradually increased during the travel of the record strip 31 past the slit 122, the marks 124 will gradually be reduced in length until the temperature has been increased to 150° F., at which time there will be produced a second long mark 124b. As the temperature is still further increased, these marks will gradually reduce in length until the temperature of 250° F. is reached, at which time a third long mark 124c will be produced.

Since the marks in the range 126 lying between the marks 124b and 124c are produced by the action of the light valve vane 115b, there will be produced adjacent the high temperature end of this range the short series of marks 130′ which serve to identify the range 126 as being that lying between 150 and 250°. Similarly, the range 127 will be properly identified by the marks 128′ and 129′.

It will be observed that at least with respect to the recording of conditions existing in a well bore which conditions are not subject to rapid changes in magnitude to any substantial degree, the marks 128′, 129′ and 130′ serve to properly identify the temperature ranges resulting from a rotation of the light valve 114 in excess of one revolution. Thus, as is indicated on the upper portion of Fig. 6, there might be produced a fourth series of marks 124 indicating a temperature range which is identified by the reference character 132. If this range is produced by the temperatures lying between 350 and 450° F., the length of the marks 124 comprising such range will be controlled by the action of the vane 115c and so will conform in appearance on the record strip 31 to the previously recorded range 125. However, reference to the record as a whole will indicate that the temperatures recorded by the instrument are gradually and substantially steadily increasing so that it can be truthfully presumed that the range 132 is associated with temperatures above 350° F. rather than temperatures lying in the range of from 50° to 150°.

The width of the record strip may be caused to represent any desired fractional portion of the total capacity of the measuring device to which it is attached, depending upon the number of vanes 115 which are provided on the light valve 114 and the number of revolutions through which such light valve is adapted to be rotated by the change in magnitude of condition measured by the measuring device 37.

In using the device above described, the instrument is preferably placed in operation and a note is made of the time at which the instrument is started travelling downwardly through the well bore. The instrument is preferably lowered at a constant rate of speed and note is made of such rate of lowering so that the location of the instrument in the well bore can be determined at any time by calculation from the rate of lowering and the elapse of time from the instant the instrument was started in its downward travel. Consequently, upon development, the record strip 31 will reveal upon inspection the depth at which each of the various temperatures or other conditions recorded thereon were recorded, since, as above described, the record strip 31 is notched ahead a predetermined distance a predetermined number of times per minute so that a given length of record strip represents a predetermined elapse of time. This time lapse, compared with the known rate of lowering of the instrument, indicates directly the depth at which the temperature or other condition was recorded.

The magnitude of the condition as recorded on the record strip may be translated in terms of known units, such as degrees Fahrenheit, pounds per square inch, or similar units by first calibrating the instrument to determine what range of magnitude is represented by the shortening of a line 124 from its maximum possible length to zero.

In the case of a temperature recording device, such as above described, the calibration would reveal that the maximum shortening of the line 124 would be representative of 100° so that when the strip is inspected, the proportional amount of shortening of a particular line to the longest one of such lines capable of being recorded on the strip represents the proportional increase in magnitude above the known starting or reference magnitude. For example, assume that it is desired to ascertain the temperature which is represented by a relatively short line identified by reference character 124e in Fig. 6 and that this line is one-fourth the length of the line 124a. It will be recalled that the range of temperatures covered by the range 125 is 100° F. and the base or reference temperature represented by the line 124a is 50° F. The amount of shortening of the record lines 124 which is represented by the line 124e is three-fourths the maximum possible length of the line or 75°, so that the temperature represented by the line 124e is 50 plus 75 or 125° F.

I have found it desirable, for the purpose of making precise and accurate measurements of the magnitudes represented by the lines 124, to enlarge or magnify the record contained on the record strip 31 and for this purpose resort may be had to an apparatus of the character illustrated in Fig. 9. This apparatus includes a light source 133 equipped with a suitable condensing means 134 adapted to project a relatively strong beam of light through the record strip 31 which is preferably disposed immediately above a film gate defining member 135. An objective lens 136 may be employed to cast an image of the record carried by the strip 31 upon a strip 137 of semi-transparent material, such as tracing cloth or tracing paper, such strip of material being suitably supported as by means of a glass plate 138.

The optical system described will serve to project upon the translucent strip 137 magnified images 139 of the record lines 124. This magnification may be limited to the direction of the length of such lines as by providing a tracing stylus 140 mounted as by means of an arm 141 and guiding members 142 for movement solely in the direction of the length of the images 139 and by supporting both the record strip 31 and the translucent strip 137 for simultaneous synchronous movement. Such an arrangement may include supporting and driving rollers 143 and 144 for the translucent strip 137 and similar rollers 145 and 146 for the record strip 31, these two sets of rollers being drivably interconnected as by a drive means 147.

In operation, the record strip and the translucent strip 137 are moved simultaneously and the tracing stylus 140 is moved back and forth in its guides 142 in such manner as to trace the locus of the ends of the images 139. This will provide a record strip having a considerably enlarged scale as measured in a direction transversely of the record strip and parallel to the length of the record lines 124 but which will embody the same scale as regards distances measured in the length of the strip. Choice of a suitable drive ratio in the drive means 147 will provide for any desired magnification of the scale as regards measurements in the direction of the length of the strip.

It will be noted that by means of this curve drawing apparatus, a complete curve or graph of the variation of well bore condition with depth of bore may be produced. Attention is also directed to the fact that at the time such a curve is traced by the tracing stylus 140, a lateral shift of the translucent strip 137 may be made at the time a transition is made from one of the magnitude ranges to the other of the ranges recorded on the strip 31 so that a single curve or graph extended over the entire range of measurements may be produced.

Reference has been had hereinbefore to the use of the recording device above described for the measurement of well bore conditions other than temperatures. I have illustrated in Figs. 7 and 8 a form of condition measuring means 37 which may be employed for the measurement of pressure and which may be coupled to the recording device 34 to cause that device to operate in the manner above described to record the magnitude of pressures existing in the well bore.

In the form of the device illustrated in Fig. 7, the shaft 36 is preferably journaled for rotation at its lower end as by means of a pivot bearing 148 and is provided near its upper end with a driving arm 149 which is suitably secured to the shaft 36 and is preferably connected as indicated at 151 to the upper end of a helical Bourdon tube 152, the open end 153 of which is extended through the lower end member 26 and packed off as by means of a packing gland 154. The lower end 153 of the Bourdon tube may be protected as by means of the guard 40.

It will be noted that as the pressure existing in the well bore is increased, the upper end of the Bourdon tube will be caused to rotate and this rotation will be transmitted by means of the shaft 36 to the light valve 114 so as to produce a record of the character previously described.

Figure 11:
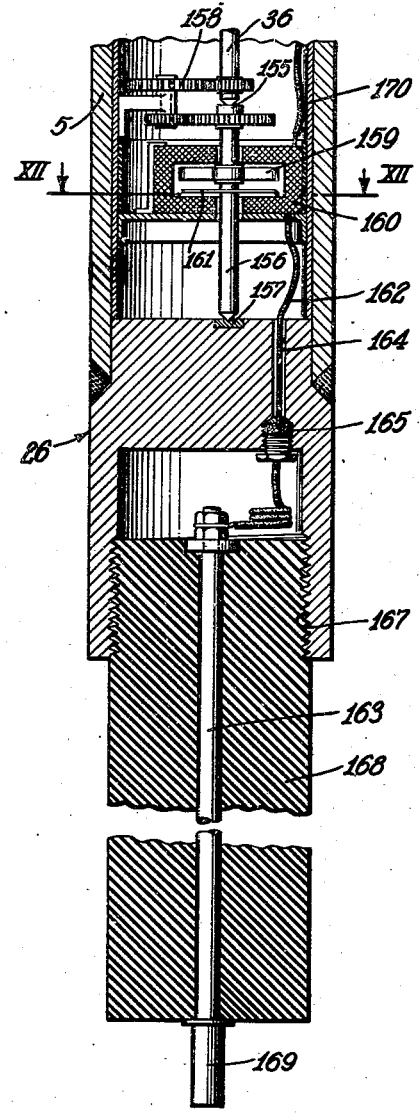
Fig. 11 is a fragmentary sectional view illustrating a modified form of construction which may be employed for the portion of the apparatus illustrated in the lower part of Fig. 2A to adapt the instrument to the recording of the electrical conductivity of the formations through which the well bore is extended.
Figure 13:
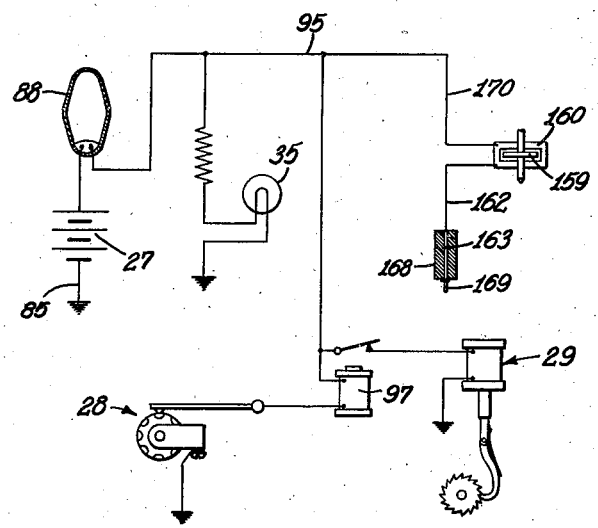
Fig. 13 is a wiring diagram similar to Fig. 10 but illustrating the additional circuits employed with the form of the device illustrated in Fig. 11.

Similarly, the recording device of my invention may be used to record the electrical resistance or conductivity of the various formations through which the well bore is extended as by employing a condition measuring means 37 of the character illustrated in Figs. 11 through 13. In this form of the device the shaft 36 which drives the light valve 114 is preferably journaled at its lower end as by a pivot bearing 155 formed in the upper end of an axially aligned shaft 156 which in turn may be journaled at its lower end as by means of a pivot bearing 157 formed on the upper surface of the lower end member 26.

The shafts 156 and 36 may be drivably interconnected with each other as by means of double reduction gearing 158 so that a partial revolution of the shaft 156 will result in one or more complete revolutions of the shaft 36. Secured to the shaft 156 is a permanent bar magnet 159 disposed in the interior of a substantially cylindrical magnet coil 160. A hair spring 161 may be employed for resisting rotation of the shaft 156 and for returning the bar magnet 159 to an initial or rest position. The magnet 159, coil 160 and hair spring 161 comprise a galvanometer of such character that the angular position of the magnet 159 relative to the axis of the coil 160 is determined by the magnitude of the electrical current flowing through the coil 160.

One terminal of the coil 160 may be connected as by means of a conductor 162 (see Figs. 11 and 13) to the upper end of an electrode 163. This connection may be afforded by passing the conductor 162 through an aperture 164 formed in the lower end member 26 and the aperture 164 may be sealed as by means of a packing gland 165. The lower end of the end member 26 is preferably internally bored and threaded as indicated at 167 to receive a relatively long bar of insulating material 168, through the center of which is extended the electrode 163, the lower end 169 of the electrode 163 being exposed as is indicated in Fig. 11.

The other terminal of the coil 160 is preferably connected as by means of a conductor 170 to the battery conductor 95 previously described so that since the opposite terminal of the battery is grounded as indicated at 85, the electrode 163 is maintained at an elevated potential relative to the instrument housing 5.

The current which flows from the exposed end 169 of this electrode through such fluid as may be contained within the well bore and through the various strata or formations surrounding the instrument and eventually back to the casing 5 of the instrument must pass through the coil 160 and the magnitude of this current is determined by the resistance or conductivity of the path through which this current flows. Since this path of current flow includes at least a portion of the formation or strata surrounding the instrument, the conductivity of the path is effected by the conductivity of the formation so that the angular position of the magnet 159 relative to the axis of the coil 160 is an indication of the relative conductivity of the formation.

By means of the interconnection between the shafts 156 and 36, the angular position of the magnet 159 is caused to be recorded in the manner previously described by operation of the light valve 114 upon the record strip 31 so that with the form of the device illustrated in Fig. 11, the record strip is caused to bear a series of marks representing the relative magnitudes of the conductivity of the different formations through which the instrument is passed. (Attention is directed to the fact that the various circuits illustrated in Fig. 13 and not specifically described in the immediate preceding paragraphs are identical in their manner of connection and operation with Fig. 10 previously described.)

From the foregoing it will be observed that I have provided a unique recording instrument which is adapted to record the magnitude of various physical conditions existing in a well bore and that the instrument may be readily adapted to the recording of many different types of physical conditions.

It will also be noted from the foregoing that by reason of the unique construction employed, the device of my invention permits the magnitudes which are recorded by the instrument to be represented on a much larger scale than has hitherto been possible, this result being achieved by recording the various condition magnitudes in a series of scales or ranges each less than the total capacity of the measuring device with which the recording device is used.

Attention is also directed to the fact that by driving the record strip at a predetermined rate of speed and by noting the time at which the record is started and the rate at which the instrument is lowered into the well bore, a direct identification of a particular condition magnitude with a particular depth is permitted.

While I have shown and described the preferred embodiment of my invention, I do not desire to be limited to any of the details of construction shown or described herein, except as defined in the appended claims.

I claim:

1. In a device for recording the magnitude of physical conditions existing in a well bore as measured by a condition measuring means attached to said device and including also an elongated light sensitive record strip, a light source, slit defining means disposed between said light source and said record strip in a position to permit casting upon said record strip a narrow line of light extending transversely of the width of said record strip, and means for moving said strip longitudinally past said slit at a predetermined rate, the combination of: a light valve for controlling the length of said line of light comprising a movable member having a plurality of uniformly spaced vanes disposed in positions to successively eclipse said slit in response to progressively increased amounts of movement of said member, each of said vanes being so shaped as to eclipse progressively larger portions of said slit upon progressive movement of said vane therepast; and means interconnecting said light valve and said condition measuring means in such manner as to cause said progressively increased amounts of movement of said movable member upon progressive variations of said condition over progressively increased ranges of magnitudes.

2. In a device for recording the magnitude of physical conditions existing in a well bore as measured by a condition measuring means attached to said device and including also an elongated light sensitive record strip, a light source, slit defining means disposed between said light source, and said record strip in a position to permit casting upon said record strip a narrow line of light extending transversely of the width of said record strip, and means for moving said strip longitudinally past said slit at a predetermined rate, the combination of: a light valve for controlling the length of said line of light comprising a movable member having a plurality of uniformly spaced vanes disposed in positions to successively eclipse said slit in response to progressively increased amounts of movement of said member, each of said vanes being so shaped as to eclipse progressively larger portions of said slit upon progressive movement of said vane therepast; means associated with said vanes for producing on said record strip indicia identifying each portion of said record strip with the vane acting to control the light impinging on such portions; and means interconnecting said light valve and said condition measuring means in such manner as to cause said progressively increased amounts of movement of said movable member upon progressive variation of said condition over progressively increased ranges of magnitudes.

3. In a device for recording the magnitude of physical conditions existing in a well bore as measured by a condition measuring means attached to said device and including also an elongated light sensitive record strip, a light source, slit defining means disposed between said light source and said record strip in a position to permit casting upon said record strip a narrow line of light extending transversely of the width of said record strip, and means for moving said strip longitudinally past said slit at a predetermined rate, the combination of: a light valve for controlling the length of said line of light comprising a movable member having a plurality of uniformly spaced vanes disposed in positions to successively eclipse said slit in response to progressively increased amounts of movement of said member, each of said vanes being so shaped as to eclipse progressively larger portions of said slit upon progressive movement of said vane therepast, at least one of said vanes having an aperture therethrough disposed in a position to be moved into alignment with said light source and slit upon movement of said vane to a predetermined position relative to said slit, whereby there is cast on said record strip in addition to said line of light a spot of light serving to identify that portion of said record strip as being made through the action of said one vane; and means interconnecting said light valve and said condition measuring means in such manner as to cause said progressively increased amounts of movement of said movable member upon progressive variations of said condition over progressively increased ranges of magnitudes.

CLARENCE R. DALE.